F. W. YOUNG.
BRIDGING BLOCK FOR DYNAMO ELECTRIC MACHINES.
APPLICATION FILED APR. 21, 1910.

996,822.

Patented July 4, 1911.

Witnesses:
Samuel W. Balch
James T. Law

Inventor.
Frederick William Young,
by Thomas Ewing Jr.,
Attorney

UNITED STATES PATENT OFFICE.

FREDERICK WILLIAM YOUNG, OF EAST ORANGE, NEW JERSEY, ASSIGNOR TO CROCKER-WHEELER COMPANY, OF AMPERE, NEW JERSEY, A CORPORATION OF NEW JERSEY.

BRIDGING-BLOCK FOR DYNAMO-ELECTRIC MACHINES.

996,822.  Specification of Letters Patent.  Patented July 4, 1911.

Application filed April 21, 1910. Serial No. 556,749.

*To all whom it may concern:*

Be it known that I, FREDERICK WILLIAM YOUNG, a citizen of the United States of America, and a resident of East Orange, county of Essex, and State of New Jersey, have invented certain new and useful Improvements in Bridging-Blocks for Dynamo-Electric Machines, of which the following is a specification.

The object of this invention is to provide in combination with a dynamo-electric machine element, the periphery of which is slotted to receive and contain windings, a bridging-block of simple and inexpensive construction by which each slot is mechanically closed so that the windings will be secured in the slot. Magnetic material is suitably incorporated into the bridging-block whereby it is made to serve the further object of increasing the surface of the element exposed to the magnetism of the field poles beyond that afforded by the ends of the teeth which lie between the slots of the element.

A further object is to render the magnetic flux sufficiently uniform into and out of the element and yet interrupt the closure sufficiently to prevent magnetic leakage between the teeth above the windings, and also avoid eddy currents.

A further object is to provide a form of construction which is easy to manufacture and easy to assemble; which will not require insulation from the slot, and which will not be a seat for eddy currents.

Figure 1:
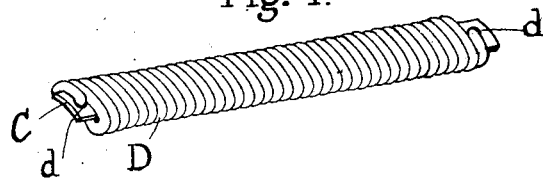
Figure 2:
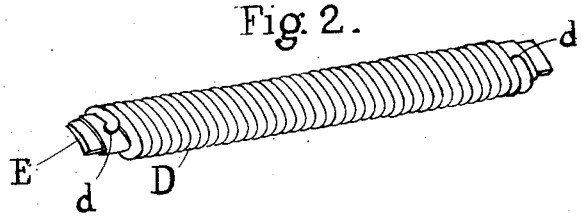
Figure 3:
Figure 4:
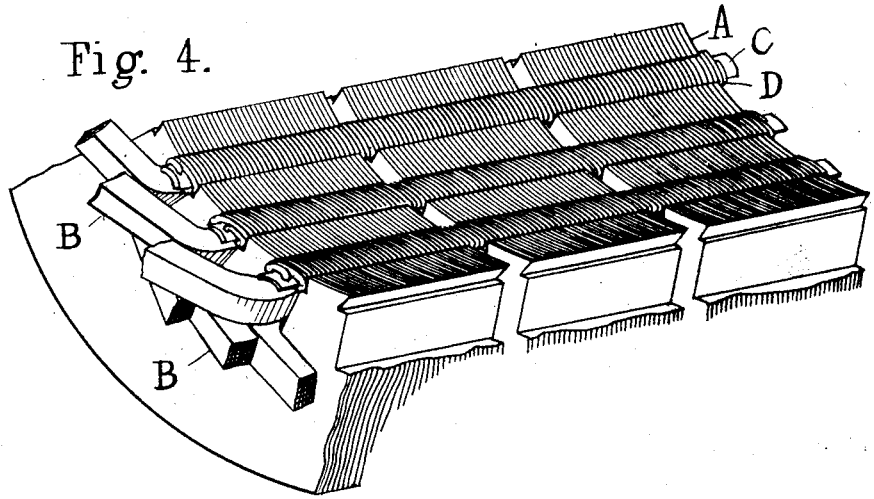

In the accompanying sheet of drawings, which forms a part of this application, Figure 1 is a perspective of a bridging-block embodying my invention. Fig. 2 is a perspective of a modified form of bridging-block. Fig. 3 is an end view of the bridging-block. Fig. 4 is a perspective of a portion of a stator of a dynamo-electric machine with windings secured by the bridging-blocks.

The invention is illustrated in connection with a laminated annular stator with slots in its concave surface, containing windings or coils B B and constituting the dynamo-electric machine stator element. The application of the invention, however, is not limited to the stator element. The walls of the slots near their mouths and above the windings are inclined, forming dovetailed shaped channels. In the form shown in Fig. 1 a core consisting of a flat strip of hard press board or fiber C helically wound with iron wire D constitutes the bridging-block which is used to close the slot. At either end a perforation $d$ through the core receives and secures the ends of the wire. The block after winding is preferably curved or bent into the shape of a shallow trough so as to have an arc-shaped cross-section, thereby enabling it to fit the slot sufficiently and adapt itself to any irregularities in the slot walls.

In the form shown in Figs. 2 and 3 a core consisting of a sheet iron strip E is employed and is wrapped with paper I before winding the wire thereon. The wire may have a coating of japan or other suitable insulation, thereby avoiding the necessity of insulating the core when of iron, and rendering quite unnecessary the use of insulation between the bridging-block and the slot walls. On account of the high electrical impedance of the helix no short-circuit is afforded between the laminæ of the element even if the convolutions electrically contact therewith.

What I claim as new, and desire to secure by Letters Patent of the United States, is—

1. The combination with a dynamo-electric machine element having coil-containing slots, of elongated slot-closing bridging-blocks, each consisting of a core of magnetic material with an insulating covering and an enveloping helix of magnetic material, substantially as described.

2. The combination with a dynamo-electric machine element having coil-containing slots, of elongated slot-closing bridging-blocks, each consisting of an arc-shaped core of magnetic material and an enveloping helix of magnetic material fitting both sides of the core, substantially as described.

3. As an article of manufacture, a slot-closing bridging-block, consisting of a core of magnetic material with an insulating covering and an enveloping helix of magnetic material, substantially as described.

4. As an article of manufacture, a slot-closing bridging-block consisting of an arc-shaped core of magnetic material and an enveloping helix of magnetic material fitting both sides of the core, substantially as described.

Signed at East Orange, N. J., this 18th day of April, 1910.

FREDERICK WILLIAM YOUNG.

Witnesses:
J. MACDONALD SMITH,
HERBERT C. PETTY.